Aug. 8, 1950 E. J. RABENDA ET AL 2,518,063
SUB AND GRAND TOTAL PRINTING, RESETTING, AND
AMOUNT TRANSFER MECHANISMS
Filed Oct. 14, 1948 10 Sheets-Sheet 3

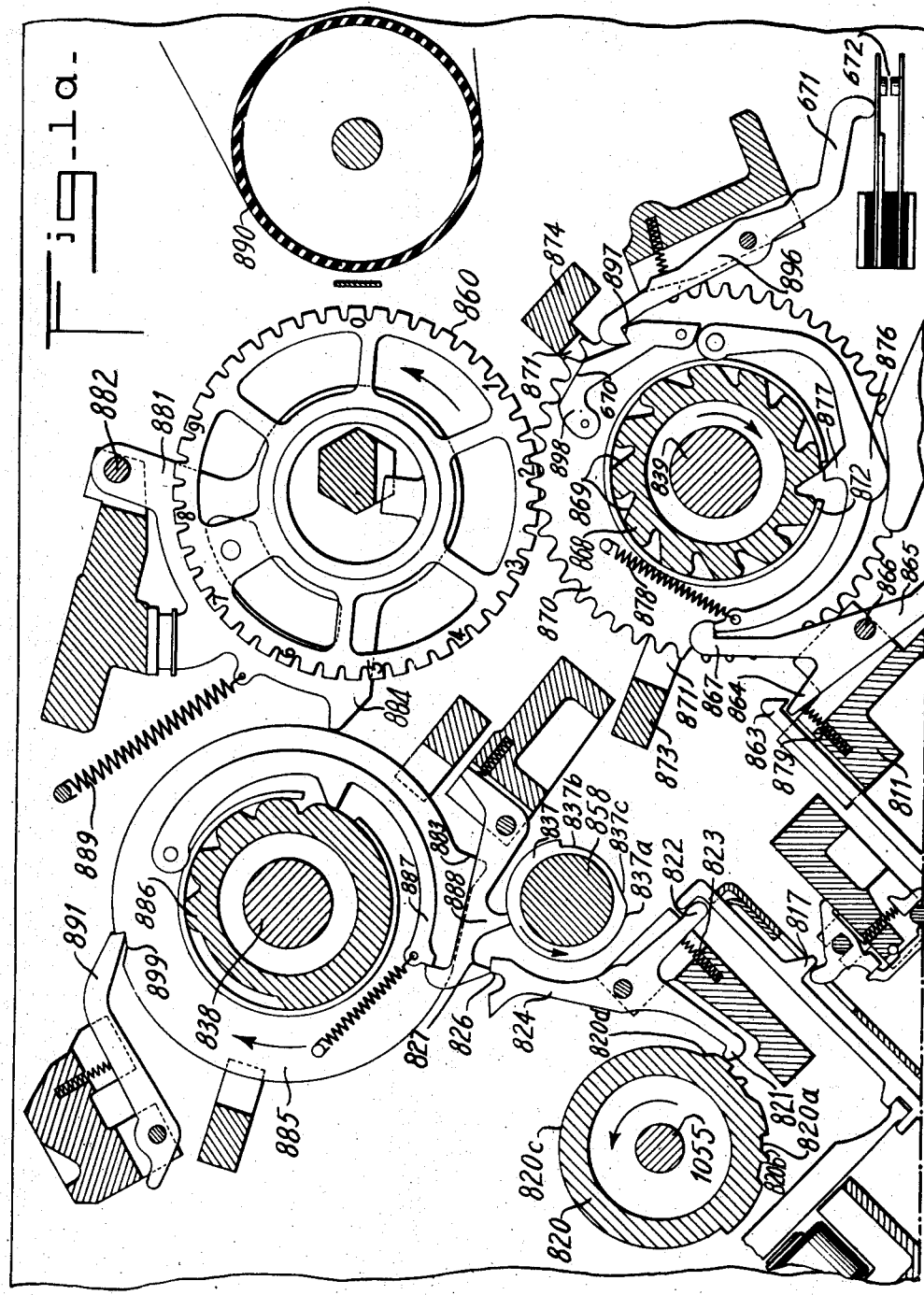

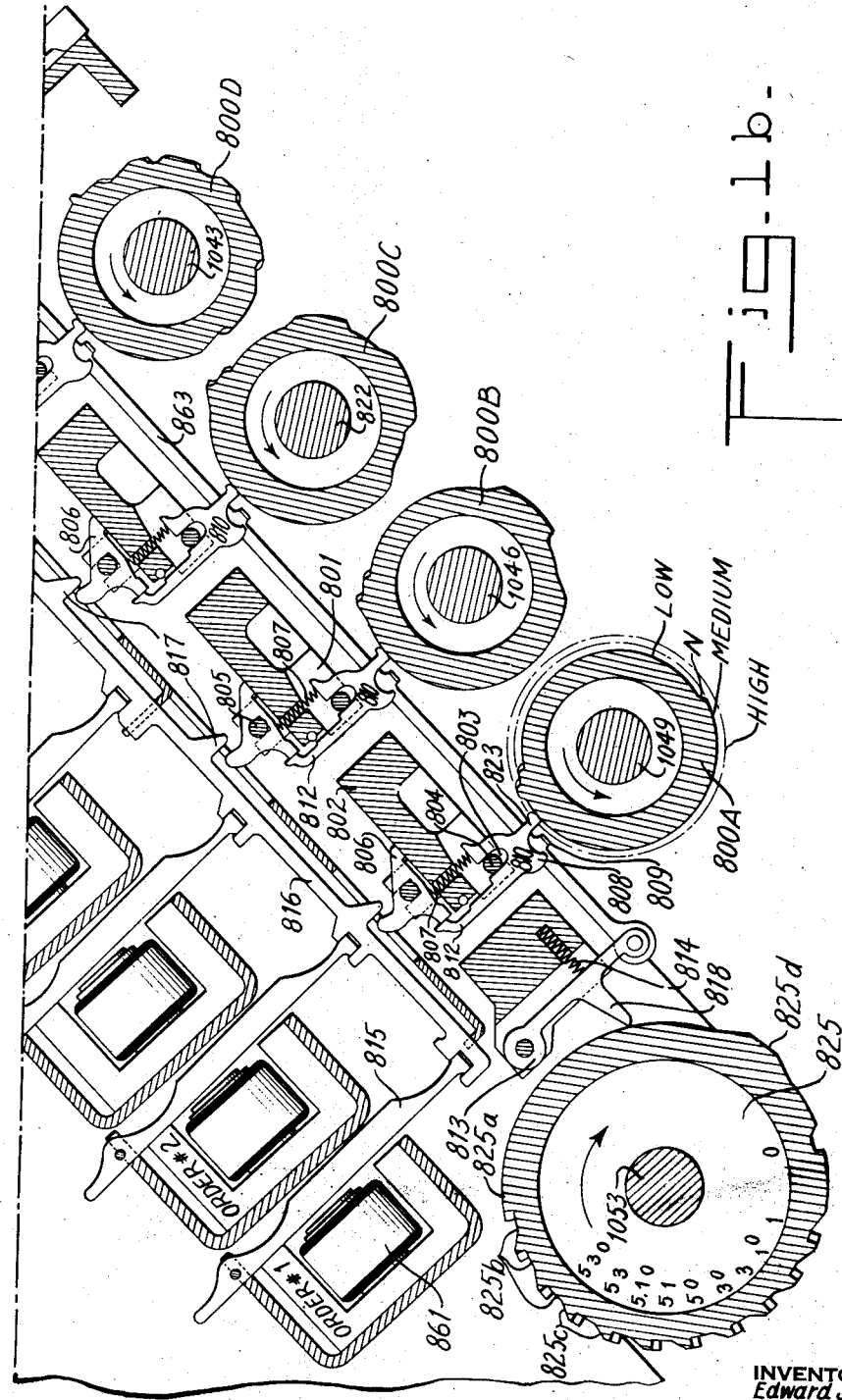

INVENTORS
Edward J. Rabenda
Ralph E. Page
BY Horace S. Beattie
ATTORNEY

Aug. 8, 1950 E. J. RABENDA ET AL 2,518,063
SUB AND GRAND TOTAL PRINTING, RESETTING, AND
AMOUNT TRANSFER MECHANISMS
Filed Oct. 14, 1948 10 Sheets-Sheet 4
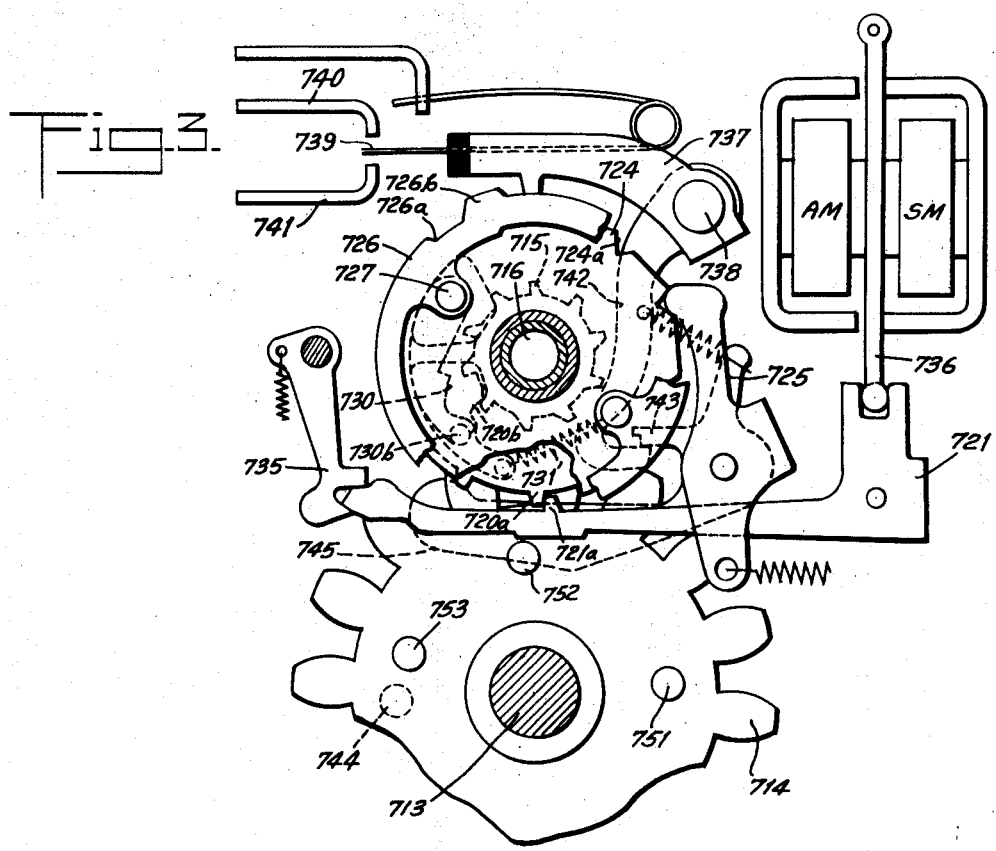
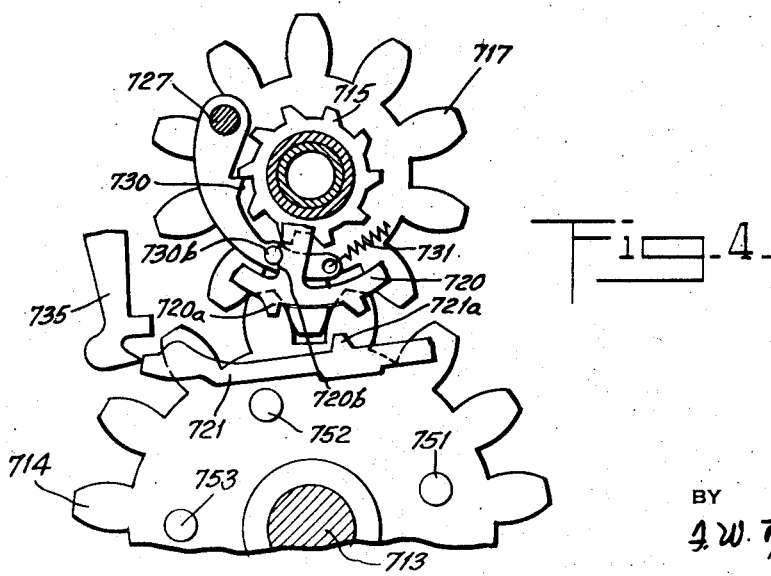
INVENTORS
Edward J. Rabenda
Ralph E. Page
Horace S. Beattie
BY
J. W. Lounsbury
ATTORNEY

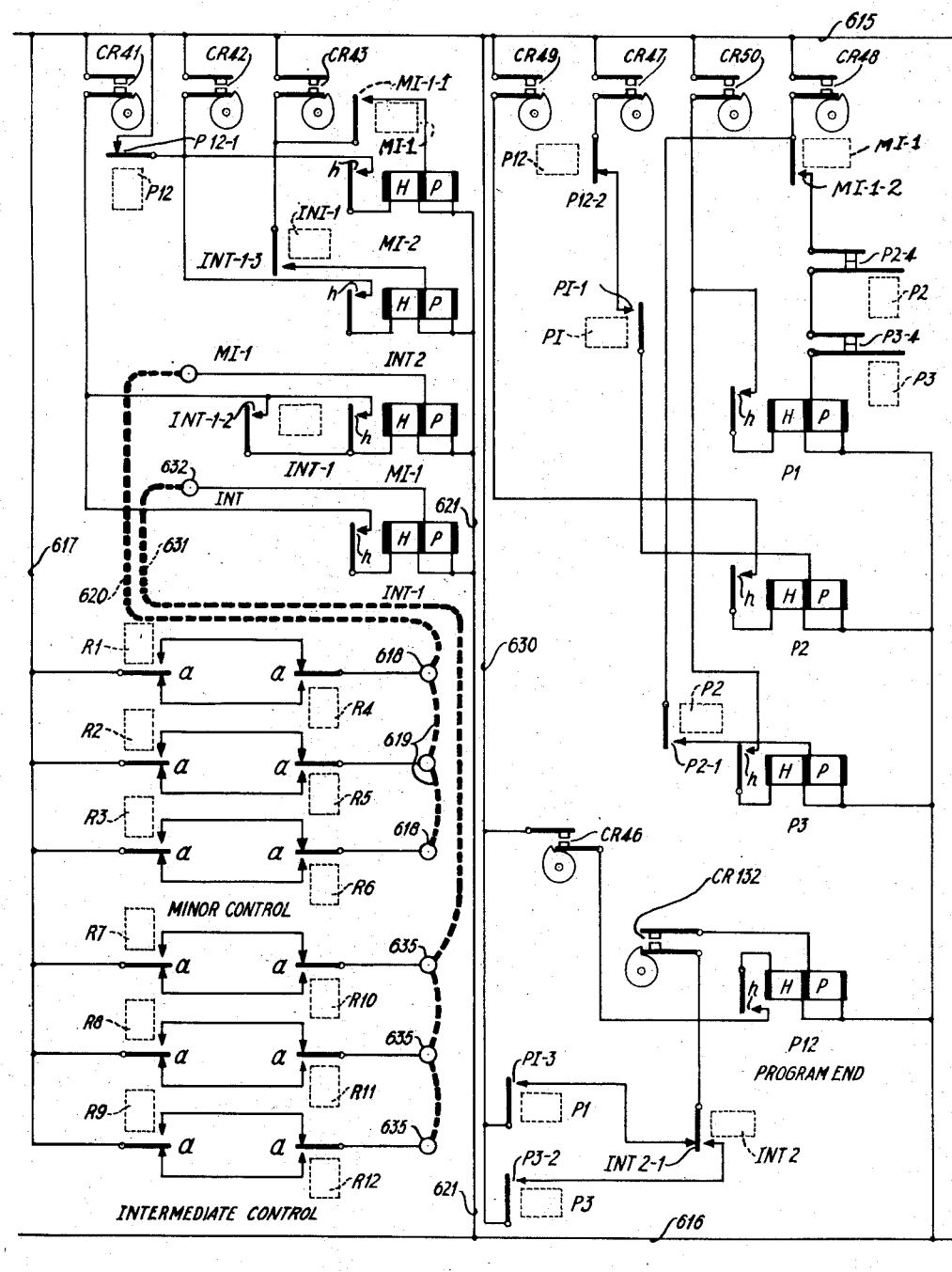

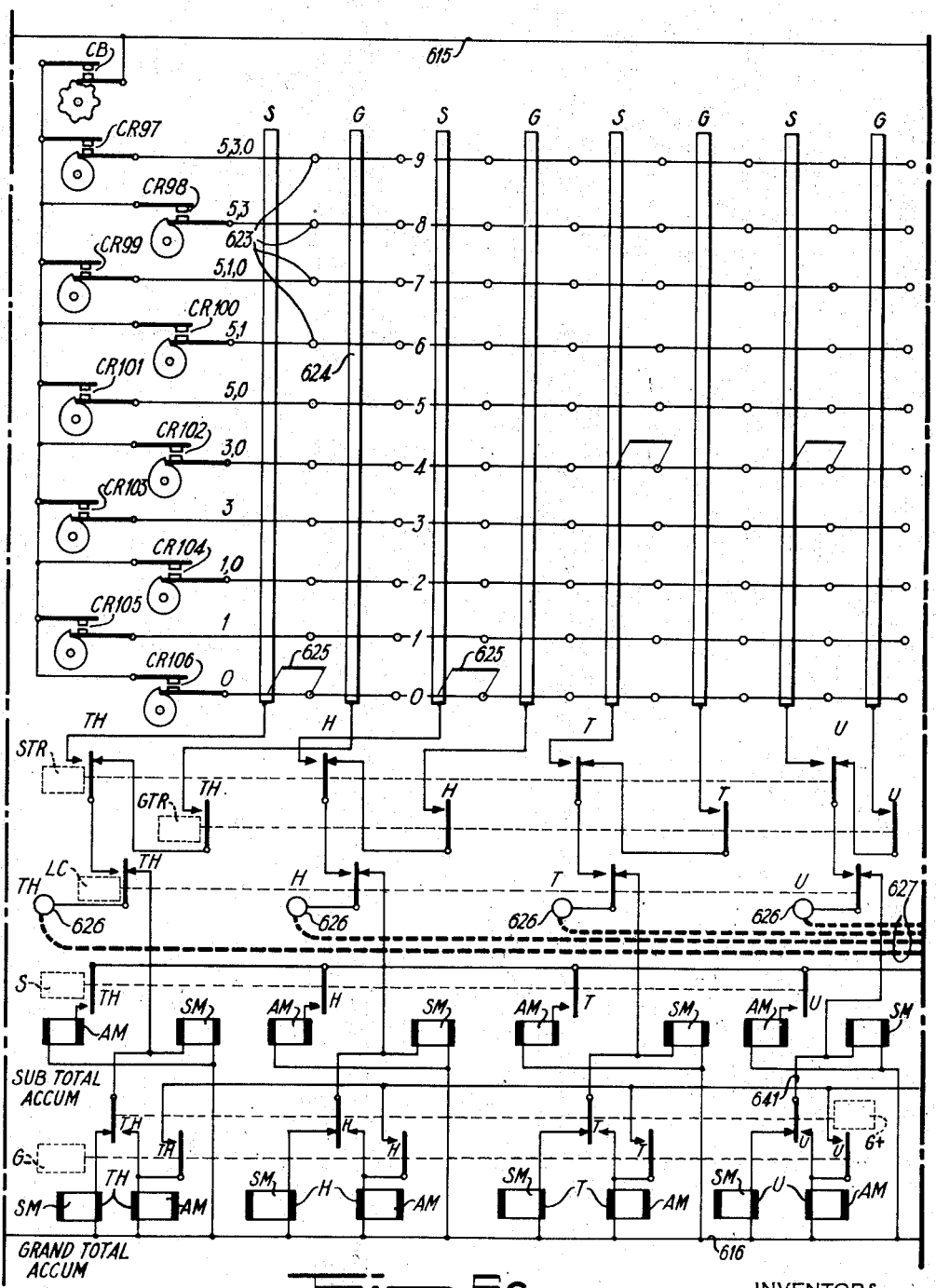

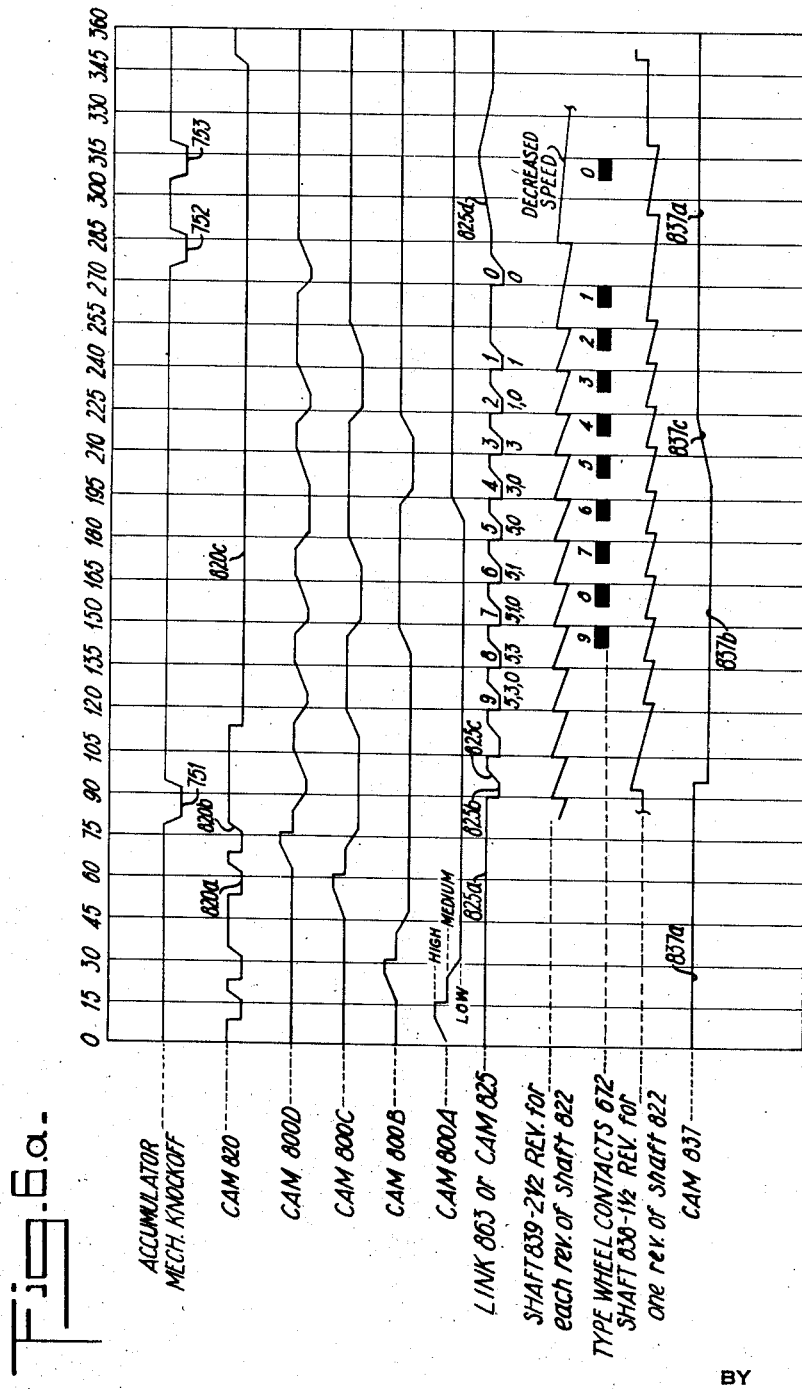

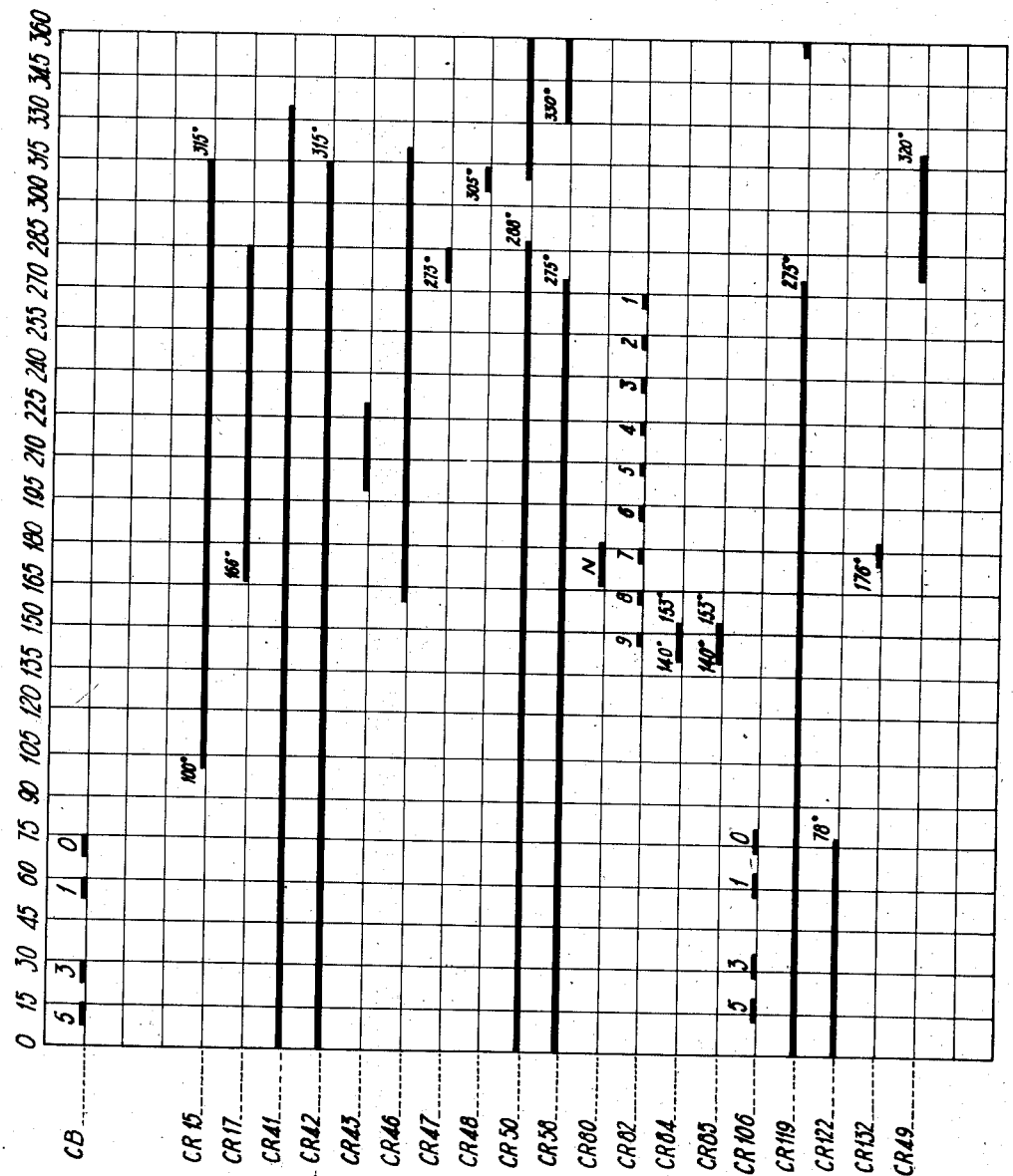

Patented Aug. 8, 1950

2,518,063

UNITED STATES PATENT OFFICE 2,518,063

SUB AND GRAND TOTAL PRINTING, RE-SETTING, AND AMOUNT TRANSFER MECHANISMS

Edward J. Rabenda, Ralph E. Page, and Horace S. Beattie, Poughkeepsie, N. Y., assignors to International Business Machines Corporation, New York, N. Y., a corporation of New York Application October 14, 1948, Serial No. 54,366

6 Claims. (Cl. 235—61.9)

This invention relates to accounting machines and more particularly to the total taking, total printing and resetting devices which are incorporated in accounting machines to obtain a printed total and reset an accumulator.

In another respect the invention relates to improvements in the type of accounting machine provided with two accumulators wherein amounts are transferred from one accumulator to another.

In machines provided with two accumulators it is customary to employ one as a sub-total accumulator which receives a series of items pertaining to a group which is then cleared out and concurrently the amount is transferred to a grand total accumulator. In this way the latter provides a running grand total of all amounts entered in the sub-total accumulator The main object of the present invention is to provide a total printing and resetting arrangement for an accumulator which will insure accuracy in the printing of the total digits and the reset of the accumulator.

Another object of the invention which relates to the total transfer arrangement is to devise an arrangement which will effect a transfer of an amount from one accumulator to another and which will insure accuracy in the result.

In electrical accounting machines, it has been the practice to read out an order of an accumulator and send a digit representing impulse to the printing mechanism to establish a position therein which will print the digit of the total and through a separate path transmit the digit representing readout impulse to the accumulator control magnet to reset the same. Of course, any lack of coincidence in the transmission of these impulses over two separate paths and the fact that the printing operation and reset operation are not interdependent may result in a lack of harmony in printing the digit of the total and resetting the accumulator.

A preferred construction and embodiment of the present invention is to have the accumulator reset device made dependent upon the printing mechanism or in a converse manner, so that in the described arrangement the impulse which initiates rotation of a printing wheel to a digit position will cause a transmission of the same digit representing impulse to reset the accumulator.

In carrying out the present invention in an electrical manner the readout impulse from the readout order of the accumulator initiates rotation of the digit representing wheel, which latter closes contacts to transmit a reset impulse to the accumulator control magnet. Resetting is preferably carried out by the complemental process so that a start impulse is transmitted to the start magnet of each accumulator wheel to initiate this rotation. The reception of the reset stop impulse by the stop magnet will terminate the rotation of the accumulator wheel, thus making the entire reset operation dependent upon digit type selection and printing.

In effecting transfers of amounts from the sub-total accumulator to the grand total accumulator this same reset control impulse is transmitted to the start magnet of the grand total accumulator wheel and such impulse functions, therefore, as a start impulse to initiate rotation of the grand total accumulator wheel to bring to a digit position corresponding to the sub-total accumulator wheel. Thus, the transfer of the digit amount is made dependent upon the sub-total printing device and is carried out in such manner as to insure not only accuracy in sub-total printing and accumulator resetting operations but also in transfer of digit amounts to the grand total accumulator.

A further object of the invention relates to means for effecting printing of the grand total and resetting of the grand total accumulator and this is preferably carried out in the same manner as for sub-total printing and sub-total accumulator reset operations.

A further object of the invention is to embody the present invention in an accounting machine of the record controlled type and to have total printing and accumulator reset operations, either for the sub-total accumulator or grand total accumulator, initiated under control of the automatic group control mechanism.

It is preferable to have the group control mechanism arranged in separate controlling sections, namely a minor control section which will initiate sub-total printing, transfer to the grand total accumulator and a sub-total accumulator reset operation and an intermediate control section which will initiate not only the three preceding operations but by a subsequent cycle of operation of the machine a grand total printing and grand total accumulator reset operation ensues.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a, 1b, with Fig. 1a joined on top of Fig. 1b, represent a sectional view showing one order of the printing mechanism employed herein for printing the digits of the total.

Fig. 3 is a view in side elevation of the preferred form of accumulator.

Fig. 4 is a view in side elevation of the accumulator shown in Fig. 3 but showing the parts in operated position in order to more clearly understand the construction and operation.

Figure 2:
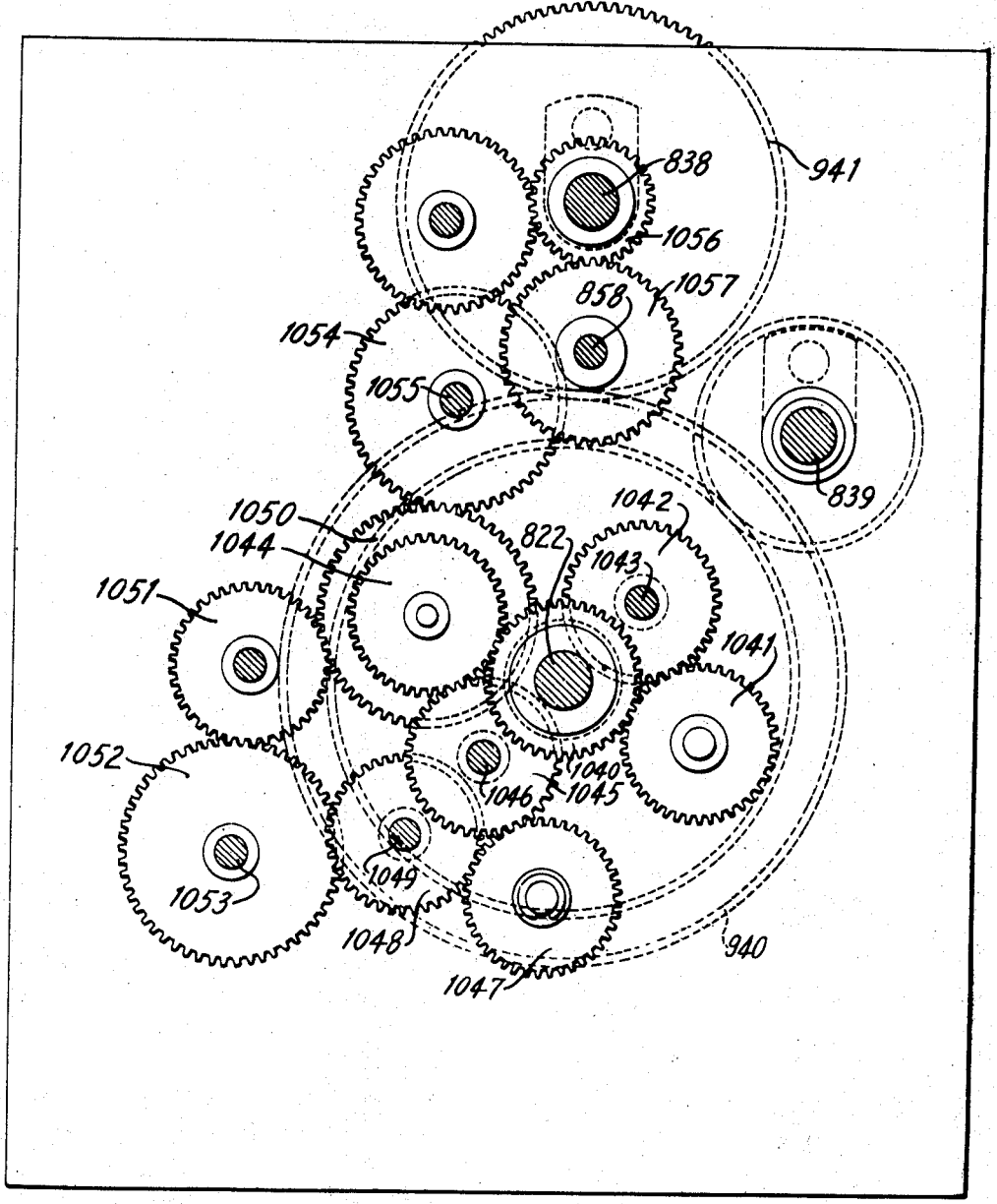
Fig. 2 is a view in side elevation of the gear drive for the drive shafts of the printing mechanism.

Figs. 5a, 5b, 5c and 5d comprise the wiring diagram of the machine when joined in the named order.

Figs. 6a and 6b, when joined with Fig. 6a on top, comprise a time chart of the machine.

Amount entering mechanism

The present invention is preferably embodied in a machine of the record controlled type wherein amounts are entered into an accumulator or accumulators according to the digit representations on perforated records which are passed successively through the machine. Since the entry mechanism forms no part of the present invention, it is not shown herein but the present machine is intended to include entering mechanism under control of combinational hole records, such as is shown in the patent application of H. S. Beattie et al., Serial No. 34,726, filed June 23, 1948, or it may comprise the entering mechanism shown in the application of R. E. Page et al., Serial No. 684,076, filed July 16, 1946, now Patent No. 2,484,114, which shows a sensing and entering mechanism controlled by records perforated according to the Hollerith type of card. It is obvious, of course, that the present improvements can also be incorporated in accounting machines of other types, such as those controlled by keys, levers, and other forms of record strips, etc.

Therefore, it is intended that the amounts be selectively entered under control of some form of digit entering and controlling devices and entered into an accumulator. It is preferable, according to the present invention, to provide both a sub-total accumulator and a grand total accumulator, the former receiving and accumulating amounts pertaining to each classified group which are then transferred as a sub-total to the grand total accumulator and then cleared out, the latter providing a running grand total of all amounts entered in the sub-total accumulator.

The accumulators are herein shown in detail, it being assumed for illustrative purposes that entries are made therein under control of a suitable entering mechanism.

The accumulators

In Figs. 3 and 4 the driving shaft 113 is driven by main drive shaft 822 in any suitable manner so as to make one revolution for each cycle of operation. For each denominational order of the sub-total or grand total accumulator, shaft 113 has a gear 114 secured thereto which drives the accumulator wheel clutch mechanism. The accumulator and clutch driving mechanism are preferably of the same construction as shown in Lake et al., Patent No. 2,328,653 and Daly, No. 2,377,762, and includes a ratchet 115 which is free on post 116 and integral with a gear 117 driven by gear 114 (Fig. 3). Rotatably carried by post 116 is a disk 720 having ten teeth 720a adapted to be engaged by a tooth 721a on the long arm of a clutch lever 721 to hold the disk against rotation in a counterclockwise direction.

At the side of disk 720 is an accumulator wheel 724 rotatable on post 716 and provided with ten peripheral notches 724a. Wheel 724 may take any of ten rotative positions with the values 0, 1 . . . 9. A spring-pressed lever 725 engages with a notch 724a of wheel 724 to hold the wheel impositively and to center it in the value position into which it has been rotated. A transfer cam 726 is fixed to the side of wheel 724 and a stud 727 in wheel 724 extends through an opening in disk 720 to pivotally carry a clutch dog 730. A spring 731 urges the tooth of dog 730 to engage ratchet 715. In the position shown in Fig. 18 the clutch lever 721 is in declutching position, its tooth 721 is restraining rotation of disk 720 counterclockwise and dog 730 is clear of ratchet 715. The dog 730 is being held clear of the ratchet by coaction of a pin 730b on the dog with a cam edge 720b of disk 720.

When the clutch lever 721 is dropped to cause its tooth 721a to release the disk 720 for counterclockwise movement the spring 731 is effective to rock the dog 730 into engagement with ratchet 715. During this movement of the dog 730 its pin 730b rides along the cam edge 720b and cams the disk counterclockwise until its tooth 720a previously engaged by tooth 721a is to the right of the latter tooth. The parts are then in the clutching position shown in Fig. 4, and the wheel 724 is coupled to the driving device 715, 717 for rotation. Through engagement of the pin 730b of the dog 730 with cam edge 720b, the disk 720 is forced to rotate counterclockwise together with the register wheel.

When the clutch lever 721 is returned to upper declutching position its tooth 721a intercepts a tooth 720a of disk 720 and stops the disk. Accumulator wheel 724 and dog 730 continue rotating while cam edge 720b of disk 720 cams the pin 730b outwardly until it is again in its outer position. As the pin 730b is cammed outwardly clutch dog 730 moves clear of ratchet 715 and declutches the accumulator wheel from the driving means. The accumulator wheel is then held and centered in its new value position by lever 725. A spring-urged latch 735 serves to hold lever 721 in either clutching or declutching position.

The clutch lever 721 has a short arm swiveled to the lower end of an armature 736 which is disposed between an advance magnet AM and a stop magnet SM. Energization of magnet AM rocks armature 736 clockwise to lower lever 721, and energization of magnet SM rocks armature 736 counterclockwise to raise the lever 721.

When the wheel 724 is in its 0, 1 . . . 8 positions, the cam 726 holds a carry lever 737 pivoted at 738 in the position shown in Fig. 3, where a contact blade 739 (insulated from lever 737) takes a midposition between contact elements 740 and 741. When the wheel is in its 9 position a tooth on lever 737 is dropped into a cut 726a of cam 726 and blade 739 contacts element 741. When the wheel 724 passes from the 9 to 0 position a rise 726b rocks lever 737 to cause blade 739 to engage element 740. When the lever is so rocked an arm 742 integral therewith is engaged and held by a spring-urged latch 743 which maintains the contact engagement between 739 and 740 until a pin 744 in gear 714 strikes an arm 745 integral with the latch 743 to release lever 742. The point in the cycle at which such unlatching occurs is indicated in the time chart. The accumulator is also provided with a mechanical knockoff or declutching mechanism which comprises three pins 751, 752 and 753 secured to the side of gear 714 and adapted during rotation of gear 714 to ride in succession under an edge of clutch lever 721.

Assume the clutch lever to be in lower position, when either pin 751, 752 or 753 engages lever 721, it cams it upwardly into the position of Fig. 3 to disengage the clutch. The knockoff pins 751, 752 and 753 are effective at fixed points of the cycle as indicated in the timing diagram of Fig. 6a. Knockoff pin 751 is used when entries are made according to the combinational hole system, knockoff pin 752 is used for clutch disengagement at the end of an entry, and 753 at the termination of a unit carry.

Total readout

The accumulator shown herein is provided with an electrical total readout which may be of the form shown and described in the patents to C. D. Lake et al., No. 2,232,006 and No. 2,138,636 and G. F. Daly, No. 2,377,762. Since the construction of the electrical total readout is well known in the art it is only shown diagrammatically in the wiring diagram of Fig. 5c. As shown therein rotatable with an accumulator wheel of each order is a brush 625 which makes contact with a common current conducting segment 624 and with one or another of the digit points or segments 623 according to the digit representation of the accumulator order. The same digit contact points 623 are interconnected by wires marked 0-9, or they may be strips also engaged by brushes 625. The digit segments 623 receive digit impulses 5, 3, 1, 0 transmitted by cam contacts CR97—CR100 and according to the digit positions of each readout order, selected impulses 5, 3, 1, 0 are transmitted to a combinational code translator, and converted thereby to a decimal digit equivalent to select the digits to be printed.

Translator and total digit printing mechanism

The present machine is provided with a printing mechanism which is adapted to print items and as shown herein to also print the totals entered in an accumulator. As will be clearer later on, the accumulator values are not read out from the readout as decimal representations but by combinational coded representations which are translated to the decimal equivalents by a translator which will now be described.

Reference character 822 (Figs. 1b and 2) represents a shaft which is rotated one revolution for each machine cycle. The shaft which drives the card feed mechanism is driven by shaft 822, and interposed between the card feed shaft and shaft 822 is the card feed clutch which is engaged by the energization of the card feed clutch magnet. The card feed clutch is well known and the control magnet corresponds to card feed clutch magnet 48 of Fig. 6 of Patent No. 2,042,324.

There will now be described the translating or converting mechanism which converts the combinational digit representations transmitted under control of the readout to a decimal equivalent which is necessary to select digit type to print the digits of the total.

Cams 800A, 800B, 800C and 800D (Fig. 1b) are driven by driving means to be subsequently described one revolution for each cycle of operation of the machine. It will be noted that these cams differ in their cam contours and the particular cam portion which is effective in each point of the operating cycle is shown in the timing diagram of Fig. 6a. Each of the cams is provided with cam heights which are identified by three dotted circles associated with the cam 800A, which circles are of three different diameters and represent the heights of the cam contours as Low, Medium and High. The corresponding designation is shown in the timing diagram of Fig. 6a for such cams to identify the particular cam portion effective in each point of the operating cycle. The cams 800A, 800B, 800C and 800D may for convenience in construction be extended longitudinally to provide fluted cam rods having the configuration and outline in Fig. 7a to cooperate with a plurality of orders.

Each cam 800 cooperates with a related releasing and blocking member 810. The reason that the member 810 is called a releasing member is that when elevated a predetermined distance by the Medium or High cam portion of the related cam 800 it will release the operating link 863 for movement but when in its normal lower position (due to the Low cam portion) it will block the link 863 against movement. Each member 810 is slidably mounted in a slot 801 of a guide block 802 and is further guided by a rod 804 which receives a guide slot 803 of the related member 810. Also pivoted on a rod 805 carried by the block 802 is a latch pawl 806. Interposed between the pawl 806 and the associated member 810 is a compression spring 807, the spring 807 functioning to urge the member 810 downwardly so as to always press against and contact with the cam contour of the related cam 800. Each member 810 is provided with a shoulder 808 cooperating with a lug 809 formed as an integral part of the link 863.

The link 863, referring to Fig. 1a, is slidably mounted in guide slots formed in a support plate 811 to support the link 863 at one end and guide its movement, and referring to Fig. 1b the other end of the link 863 is dependently hung by arm 813, which arm has a cam follower extension 818. A compression spring 814 fitting in a spring support and guide block for arm 813 urges the link 863 to the left and when such spring is effective for action under control of a cam 825 it serves as the source of mechanical impulse transmitted to link 863 at a differential time to rock a clutch release arm 867 to engage a clutch to initiate rotation of a type wheel.

Recalling now that each cam 800 has cam contours of three different heights, it should be observed that when member 810 is at a position determined by the low portion of the cam 800 the shoulder 808 abuts lug 809 to block the link 863 from movement to the left, urged by compression of the spring 814. In attempting to do so lug 809 will bear against the shoulder 808 and urge the member 810 clockwise, which movement is restrained by the cooperation of an upstanding hooked portion 812 of member 810 against the latching end of the pawl 806. Assuming now that a cam has been rotated so that the Medium cam portion of the cam contour has raised the member 810, such difference in cam height with respect to the Low cam height will elevate shoulder 808 slightly further above the related lug 809 and by the continued cooperation of the hooked extension 812 of the member 810 with the extremity of the pawl 806, clockwise movement of the pawl 810 will still be restrained.

Assuming now that the High cam portion has positioned the member 810 to its maximum height, the shoulder 808 will be still further above the lug 809 and the member 810 is now in such position that the compression spring 807 will be effective to rock the member 810 clockwise so that a hooked extension 812 will catch over the latch end of pawl 806, provided that at this time the pawl 806 is rocked counterclockwise due to the transmission of an impulse to magnet 861 at the time the member 810 is in its highest position. If the pawl 806 is not rocked slightly counterclockwise, no latching of the member 810 will take place. Summarizing, whenever the High portion of a cam has elevated a member 810 to the highest position such member will be latched if the related pawl 806 is concurrently rocked to latching position. If there is no rocking of the pawl 806 at this time member 810 will not be latched, and will be subsequently free to move up and down in accordance with the successive cam contour as the related cam 800 rotates.

The above description has been confined to the operation of the parts under control of the cam 800A but it should be noted that identical operations are effected under control of the remaining cams 800B, 800C and 800D. For this reason, the description of operation need not be repeated for duplicate parts.

For the purpose of rocking the pawls 806 to latch those members 810 which are at their highest position it will be seen that referring to Fig. 1b each translator control magnet 861 when energized attracts an armature 815 and rocks the same so as to shift a related connected link 816 to the left. Extending from the link 816 are four integral extensions 817, each of which cooperates with the related pawl 806. The result of this construction is that the impulse directed to the magnet 861 will shift the link 816 and rock the four pawls 806 concurrently but only that pawl 806 is effective for latching the related member 810 if the associated member 810 has been elevated to its highest position. Therefore, one or more of the pawls 806 may be rocked idly at the same time without latching the related members 810.

To prevent the armature 815 from sticking to the core of the magnet 861 due to residual magnetism, it is desirable to provide means to positively restore the link 816 and armature 815 to normal by mechanical means timed with the rotation of the cams 800. To this end there is provided a magnet knockoff cam 820 (Fig. 1a) notched as shown. A follower arm 821 of a clutch release arm 824 cooperating with the cam 820 has a depending arm 822 urged by a spring 823 against an upstanding finger of the link 816. At the time the magnet 861 is energized it will be observed that follower arm 821 cooperates with a notch 820a of the cam 820. Thereafter, such arm cooperates with the following cam portion 820b to rock arm 821, link 816 and armature 815, restoring the armature 815 to normal if it should remain attracted to the core under the above circumstances.

Referring now to Fig. 6a, it is obvious that at the time the impulses 5, 3, 1, 0 are directed by cam contacts to be described to magnets 861, one of the cams 800 will have its High portion in cooperation with the latching members 810. For example, at the time the 5 impulse is directed the High portion of cam 800A will be effective. At the time the 3 impulse is directed only cam 800B will have a High portion effective at this time. For all of the electrical impulses 5, 3, 1, 0, this condition may be represented by the following table:

| Impulses | Members 810 latched |
|----------|---------------------|
| 5        | 810A                |
| 3        | 810B                |
| 1        | 810C                |
| 0        | 810D                |

It is obvious from the above table that members 810 are latched singly or in predetermined combinations, according to the code so that at the termination of the transmission of the electrical impulses 5, 3, 1, 0 all or some of the members 810 will be latched, and others will not be latched and therefore free to be positioned according to the contour of their cams during their subsequent rotation. It is explained that once a member 810 is latched it is not free to thereafter move upwardly and downwardly in accordance with the subsequent cam contour of the related cam, but remaining unlatched members 810 can do so.

Movement of the operating link 863 to the left during the time that the 5, 3, 1, 0 impulses are transmitted, which movement might be permitted if all of the four members 810 for this order may be either latched or elevated so as to be above the lugs 809, is restrained by a cam portion 825a of cam 825 (Fig. 1b). This cam, through driving means to be subsequently explained, is driven synchronously with the cams 800 and 820 and cooperates with the follower extension 818 of arm 813. As shown in the timing diagram, during the transmission of 5, 3, 1, 0 impulses, the High portion 825a of cam 825 will restrain movement of the operating link 863 to the left.

After latching of members 810 in predetermined combinations the contour of the cams 800A, 800B, 800C and 800D which are thereafter effective will determine the time in the operating cycle that the operating link 863 will be moved to the left in a manner now to be described in detail:

After one or more members 810 are latched in combination according to the impulses transmitted as indicated in the preceding table, the further rotations of the cams 800A, 800B, 800C, 800D will raise and lower the remaining unlatched members 810 according to the cam contours of the respective cams, but during said further rotation of the cams the link 863 will be restrained against movement by one or more of such unlatched members until a point is reached in the operating cycle when the cams related to the unlatched members concurrently present cam operations of Medium height to the unlatched members. It will be recalled that since the latched members 810 are so positioned that they do not restrain the movement of the link 863 under the influence of the spring 814 and further the elevation of any unlatched member by a cam portion of Medium height will also unlock the link 863, it is obvious that when both of these conditions exist for four of the members 810, the link 863 is then free to move under the influence of the spring 814 and cam 825. This will be made clear by reference to a particular example.

If, for example, the 5, 3, 0 impulses (representing 9) are transmitted under control of a readout order when it represents 9 members 810A, 810B and 810D are latched due to the High cam portions of their respective cams 800A, 800B and 800D and such latching of members 810A, 810B and 810D is completed about 75° of the operating cycle (see Fig. 6a). At this time, the members 810A, 810B and 810D are latched in the highest position so that they unlock the operating link 863 at such positions. However, cam 800C in its subsequent rotation continues to lower and raise the related unlatched member 810C and such unlatched member 810C will restrain the operating link 863 from movement until about 123° of the operating cycle, at which time cam 800C through its Medium high cam portion shifts related latching members 810 to unlock the link 863. At this time cam follower extension 818 of the arm 813 will cooperate with the notch 825b designated 5, 3, 0 in both Fig. 1b and the timing diagram of Fig. 6a. Operating link 863 is now unlocked at four points and the movement of the link to the left is effected at about 123° by spring 814. The link will now operate the clutch release arm 867 and therefore engage a type selecting clutch to be described to initiate the rotation of the printing wheel 860 to select the numeral type 9.

Reverting now to Fig. 1b, when the operating link 863 is moved to the left to effect the engagement of the type selecting clutch the cam follower extension 818 is in the bottom of the notch 825b of the cam disk 825 and further rotation of the cam 825 in a clockwise direction will, through the following inclined cam portion 825c, cooperate with the cam follower extension 818 to positively restore the operating link 863 to the right without, however, causing the unlatching of any latched member 810. At about 315° an extra High cam portion 825d will shift link 863 to the right beyond the normal position, and in so doing for those members 810 which have been latched lug 809 will engage the shoulder 823 of the respective member 810 to rock the same counterclockwise to unlatching position, spring 807 being compressed during this operation to rock pawl 806 to normal position. With respect to any unlatched member 810, movement of the link 863 to the right at this time may also effect movement of such members 810 but the operation of such is ineffective.

While the operation of the machine has been described in connection with the manner of engaging the type wheel clutch when the 5, 3, 0 impulses are transmitted, to select the 9 type when a readout order represents 9, the same principle of operation for effecting the above results is involved for other combinations of impulses as is evident from the following table:

| Readout Digit Representation | Impulses Transmitted | Members 810 Latched | Cams 800 at Medium Cam portion |
|---|---|---|---|
| 9 | 5, 3, 0 | 810A, 810B, 810D | 800C |
| 8 | 5, 3 | 810A, 810B | 800C, 800D |
| 7 | 5, 1, 0 | 810A, 810C, 810D | 800B |
| 6 | 5, 1 | 810A, 810C | 800B, 800D |
| 5 | 5, 0 | 810A, 810D | 800B, 800C |
| 4 | 3, 0 | 810B, 810D | 800A, 800C |
| 3 | 3 | 810B | 800A, 800C, 800D |
| 2 | 1, 0 | 810C, 810D | 800A, 800B |
| 1 | 1 | 810C | 800A, 800B, 800D |
| 0 | 0 | 810D | 800E |

It will be recognized from this table that the concurrent position of cams 800 at a Medium height cam portion for those cams which have not previously latched members 810 will determine the time the mechanical impulse is transmitted.

The mechanical impulse transmitted to link 863 causes the engagement of a clutch to rotate a printing wheel 860 to a selected digit position.

When the clutch is engaged it is driven by a shaft 839, rotated by means to be later described.

For each printing order there is pivoted on a rod 866 a triple arm member consisting of arms 864, 865 and a clutch release arm 867.

Shaft 839 has secured thereto a tube 868 which is fluted transversely along its periphery to provide clutch notches 869. Tube 868 constitutes the driving clutch member. Encircling the clutch tube 868 is a plurality of gears 870, there being one gear for each order of the printing mechanism. For mounting the gears 870 on the clutch tube 868 each gear has integral therewith a flange 872. To provide for the lateral spacing between the gears 870 the gears are guided by guide slots 871 formed in guide blocks 873 and 874. By such spacing members the gears 870 are separated to allow independent rotation and to also locate a clutch pawl 876 which is pivoted on the related gear to cooperate with the clutch release arm 867. The clutch release arm 867 normally holds the clutch pawl 876 in such position that its tooth 877 is out of engagement with any of the clutch notches 869 of the clutch tube 868. When the clutch release arm 867 is rocked as a result of the actuation of the operating link 863 at a differential time, the clutch is engaged because a spring 878 attached to clutch pawl 876 will rock the latter in order that the clutch tooth 877 will engage a clutch notch 869 determined by the differential time the operating link 863 is actuated. The above described clutch is the printing type selecting clutch and causes the differential rotation of the printing wheel 860, since the gear 870 and the printing teeth of the type carrying wheel 860 are intergeared.

Figs. 22a and 22b show the arrangement of the total digit printing devices for a single order and the machine is preferably provided with duplicate devices for printing a plurality of digits of the total.

If, as previously described, the operating link 863 was shifted at about 123° as a result of the 5, 3, 0 digit impulses because a readout order represents 9, the clutch release arm 867 would be rocked at this time and pawl 876 would be released and rocked by spring 878 so that clutch tooth 877 engages a clutch notch 869, and printing wheel 860 will thereafter continue to rotate to such position as to present the numeral "9" to the printing line. The differential time at which the operating link 863 is actuated determines the extent of counterclockwise rotation of the printing wheel 860 from a rest position necessary to select a numeral type. After the predetermined extent of rotation of the printing wheel 860 has been effected and the printing impression has been effected, with the type selecting clutch still engaged, the printing wheel 860 will continue to rotate until the free end of the clutch pawl 876 strikes the clutch release arm 867 which, in the meantime, has been brought to its normal position, by means of a compression spring 879 (Fig. 1a). When such disengagement is effected the printing wheel 860 is at the normal position shown in Fig. 1a.

Each printing wheel 860 is carried by an arm 881 loosely pivoted upon a rod 882 and provided with a rearwardly extending follower extension 884 which is operated by a cam projection 883 of a cam disk 885 which constitutes a driven member of a printing clutch.

Shaft 838 rotates a clutch tube 886 fixed thereto and likewise encircling the clutch tube 886 is the driven clutch disk 885 upon which is pivotally mounted a clutch pawl 887. Clutch disk 885 and parts carried thereby are guided similarly to gear 870. Associated with the clutch pawl 887 is a clutch release arm 888. When the clutch engagement is effected between the clutch pawl 887 and one of the clutch notches of the clutch tube 886, the disk 885 will be rotated in a clockwise direction, whereby the cam projection 883 will cooperate with the follower extension 884 to rock arm 881 about the rod 882 against the action of the return spring 889. The engagement of the clutch now being described is effected when the printing control magnet 861 for each order is again energized for numeral printing by an "N" impulse.

When the printing clutch engagement has been effected, each cam 885 will cooperate with the related follower extension 884 to rock the associated printing arm 881 to force the printing wheel 860 against the usual inking ribbon and platen 890 around which platen is positioned the paper strip to be imprinted. As each arm 881 is rocked against the action of the spring 889, the printing wheel 860 is being rotated counterclockwise but since the printing wheel is now rolling over the gear 870 this rolling action will cause an equal and simultaneous rotation in a clockwise direction. Both of these opposite rotations will, in effect, cause the printing wheel to be substantially immobile with respect to its rotation when it moves to the right to strike the platen 890, the type striking the platen squarely and firmly to cause a legible impression.

After the printing operation, when cam extension 883 of the cam disk 885 passes by the follower extension 884, spring 889 will now be effective to return the type wheel carrying arm 881 to normal position and the extension 884 now bears against the circular peripheral edge of the cam disk 885.

After the printing operation, since the type selecting clutch is still engaged, the printing wheel 860 continues to rotate as previously stated until the clutch pawl 876 strikes the clutch release arm 867 which, in the meantime, has been positioned to normal, thereby disengaging the type selecting clutch when the printing wheels are at normal position.

The printing clutch continues its engagement for a complete rotation of the cam 885 and the clutch disengagement is effected by the engagement of the clutch pawl 887 with the clutch release arm 888.

As the free end of the clutch pawl 876 strikes the clutch arm 867 there is a tendency to cause the gear 870 to rebound counterclockwise. This action is prevented by the cooperation of a spring-pressed detent 896 with a shoulder 897 of a plate 898 secured to each gear 870. When the normal position of the clutch is obtained, the detent 896 will engage the shoulder 897 to prevent such rebound and retain the clutch parts in their normal position.

A somewhat similar rebound preventing mechanism is also provided for the printing clutch which consists of a spring-pressed detent 891 cooperating with the shoulder 899 of the cam disk 885.

Upon the transmission of said "N" impulse, by a circuit to be described, the second energization of the magnet 861 again attracts its armature 815 and shifts link 816. The latter thereupon rocks clutch release arm 824 to unlatch the clutch release arm 888 of the printing clutch. At this time a low portion 820c (see Fig. 1a) of a cam 820 cooperates with the cam follower extension 821 so as not to restrain the rocking of clutch release arm 824. When the clutch release arm 888 is unlatched a depending extension 827 moves in a clearance portion 826 of said arm 824. Cam disk 885 will now rotate counterclockwise and the cam extension 883 will strike the follower extension 884 at the time the selected numeral type is at the printing line to effect the printing impression.

It is undesirable to have the clutch release arm 888 released whenever link 816 is rocked the first time to rock arm 824 to engage the printing wheel clutch and during this time a high portion 837a of cam 837 cooperates with arm 888 to block it against movement to release the printing clutch. When the N pulse is transmitted as will be later described the low portion of cam 837b will cooperate with clutch release arm 888 to permit its rocking to engage the printing clutch. After this the cam rise 837c of cam 837 will function to positively retract the clutch release arm 888 to normal position to cause disengagement of the clutch release pawl 887 after a complete revolution of the printing clutch. At the termination of the operating cycle a cam rise 820d of cam 820 functions to rock the clutch release arm 824 clockwise to again position it beneath the extension 827 of the clutch release arm 888, which previously has been elevated to the position shown in Fig. 1a. The cam rise 820d also shifts link 816 to restore armature 815 to normal if it should stick to the core of magnet 861.

*Gear drive for printer*

In Fig. 2 reference numeral 838 designates the printing impression drive shaft which is driven at a uniform speed of rotation for each cycle of the operation of the machine. The drive shaft 822 has secured thereto a gear 940 which drives a gear 941 secured to the printing impression drive shaft 838 to rotate the latter at a uniform speed of rotation of one and a half revolutions for each revolution of drive shaft 822.

Shaft 839 represents the type selecting drive shaft which rotates 2½ revolutions for each operating cycle. The shaft 839 is driven at times with a uniform speed of rotation synchronous with the drive shaft, but at other times the speed of rotation given to shaft 839 is decreased or increased with respect to drive shaft 838, in order to select the desired alphabet type of a selected group of alphabet type. This means to effect the variable drive of shaft 839 is disclosed in full details in Patent No. 2,439,445, issued to H. S. Beattie, and since the alphabet printing is of no concern here it need not be described to understand the present invention. With such variable speed drive the shaft 839 will rotate the type wheel at a decreased speed to present the selected numeral type to the platen at about 330° of the cycle, at which time the previously clutched printing cam 885 will have its cam projection 883 in position to strike the projection 884 to impress the selected numeral type against the platen 890.

The machine includes a driving means driven by the shaft 822 for rotating the cams 800A, 800B, 800C and 800D, 820, 825, 837 and 887 in synchronous relationship and such cams are driven one complete revolution for each operating cycle.

The driving means for driving cams 800A, 800B, 800C and 800D will now be described. Secured to shaft 822 is a gear 1040 (Fig. 2) which, through a gear 1041, drives a gear 1042 secured to the drive shaft 1043 for the cam 800D. Shaft 822 is extended to directly drive the cam 800C. Referring to Fig. 2, gear 1040 through a gear 1044 drives a gear 1045 secured to the drive shaft 1046 for cam 800B. Gear 1045, through an idler gear 1047, drives a gear 1048 secured to the drive shaft 1049 for the cam 800A. By such driving means the cams 800A, 800B, 800C and 800D are driven synchronously.

Referring to Fig. 2 gear 1044 has rotatable therewith a gear 1050 which, through an idler gear 1051, drives a gear 1052 attached to the shaft 1053 to which the cam 825 is secured.

Gear 1050 also meshes with a gear 1054 secured to a shaft 1055 to which shaft the cam 820 is secured.

Also referring to Fig. 2 to drive shaft 838 there is secured a gear 1056 which meshes with a larger gear 1057 secured to a shaft 858 to which shaft the cam 837 is secured.

Thus, through the intergearing last described, the operating cams 820, 825 and 837 are driven synchronously with the operating cams 800A, 800B, 800C and 800D.

Automatic group control

In record controlled accounting machines in which the present invention is preferably embodied, it is desirable to initiate total taking operations under control of the well known automatic group control means. Briefly, such means includes devices for analyzing the holes in corresponding columns, determining the presence of similar or dissimilar holes in the compared columns, and upon detecting a group number change, total taking operations are initiated. The arrangement for analyzing such holes and picking up comparing relays is well known and for this reason only the comparing circuits for both intermediate and minor control are shown in Fig. 5a. As is well known, two paired relays are energized under control of the holes in corresponding columns and such paired relays consist for the minor control of the three orders shown herein; R1 and R4 relays, R2 and R5, and R3 and R6. Upon an occurrence of holes at the same index point positions the $a$ transfer contacts of R1 and R4 relays are concurrently transferred and upon dissimilarity of holes only one of such $a$ contacts is transferred. From the line side 616 there is a wire connection 617 supplying current to the comparing circuit. When the transfer contacts of paired relays R1 and R4 are concurrently transferred, the circuit between wire 617 and the plug socket 618 remains open. If either relay R1 or R4 alone is energized, then one of the $a$ contacts transfers, thus completing the circuit from line 615, wire 617, R1a transfer contacts now transferred by way of example, R4a transfer contacts now normal, to plug socket 618. When comparing is effected by three orders, as shown by way of example, interconnecting plug connections 619 are made, and extending from one of the plug sockets 618 there is a plug connection 620 which extends any closed comparing circuit to pickup coil of the MI1 relay, which latter is connected by the wire 621 to the other line side 616. MI1 relay closes the $h$ contacts and a hold circuit extends through such contacts and CR41 cam contacts to the line side 615. The MI1 relay is known herein as the minor control relay and initiates printing of a sub-total, resetting of the sub-total accumulator, and transfer of amounts from the sub-total accumulator to the grand accumulator.

The minor control relay MI1 closes its MI1—1 contacts so that when CR43 cam contacts close a circuit will be completed from line 615, through CR43 cam contacts, MI1—1 relay contacts now closed, pickup coil of MI2 relay, wire 621 to line side 616. MI2 relay is held up by a hold circuit through the $h$ contacts and CR42 cam contacts, to line side 615. There are shunt contacts around C42 cam contacts consisting of P12—1 relay contacts controlled by the "end of the program" control relay P12. Therefore, when CR42 cam contacts open at 315° in the cycle in which a change has been detected, the MI2 hold relay coil is nevertheless maintained energized by P12—1 contacts during the sub-total taking cycle and then deenergized when CR42 cam contacts open. MI2 hold relay coil is, however, held energized during a following grand total taking cycle, if it takes place, and will be deenergized in the grand total taking cycle when CR42 cam contacts and P12—1 both open, as will be described later.

Referring now to Fig. 5a, at 305° when cam contacts CR48 close, a circuit is completed from line side 615, cam contacts CR48, MI2—2 relay contacts now closed, P2—4 interlock contacts now closed, P3—4 interlock contacts now closed, pickup coil of the P1 relay to line side 616. A hold circuit is completed through the $h$ relay contacts and cam contacts CR50 to line side 615. Cam contacts CR50 hold the P1H relay coil energized until about 288° of the cycle in which sub-total printing and accumulator reset operations are effected under control of the sub-total accumulator and a transfer of the sub-total amount to the grand total accumulator.

Sub-total, printing and accumulator reset control relay

By means of a plug connection 622 (Fig. 5b) the machine is conditioned to print a total from the sub-total accumulator and thereafter reset the same. In the cycle in which a change in minor group numbers has been detected CR58 cam contacts close, thus completing a circuit from line side 615, CR58 cam contacts, P1—2 relay contacts now closed, plug connection 622, the STR sub-total and reset relay to line side 616. Thus, from the timing of CR58 (Fig. 6b) it is evident that the STR relay is held energized until about 275° of the cycle during which a sub-total printing and reset of the sub-total accumulator occurs.

Other relays for conditioning machine for total printing and accumulator reset operations and transfer to grand total accumulator These relays are LC, S—, G+, PCC and RN relays (see Fig. 5b) and the energizing circuits thereof will be explained as their requirement is needed for the description of the operation of the machine.

At the end of the cycle in which a minor group number change has been detected CR119 cam contacts close to complete a circuit from line side 615, cam contacts CR119, STR2 contacts now closed, the GTR3 transfer contacts now normal, S— relay coil, the G+ relay coil in shunt therewith, to line side 616. CR119 cam contacts keep the S— relay and G+ relay closed until about 275° of the cycle during which a total printing, reset, and transfer of sub-total occurs. When CR122 cam contacts close between 0–78° of the total printing and reset cycle a circuit is completed from line side 615, cam contacts CR122, STR3 relay contacts now transferred, LC relay, to line side 616.

With LC relay energized total printing takes place in the following manner:

Total printing control circuits

Total printing in the present machine is performed under control of the total readout in conjunction with the combinational code translator described in the section designated "Translator and total digit printing mechanism" which converts the combinational hole impulse reading derived from the readout sections of the accumulator to a single digit differentially timed equivalent to thereby select a corresponding digit type.

Each readout section or order of both the sub and grand total accumulator comprises a series of digit contact points 623 (Fig. 5c), a common current conducting segment 624 and a brush 625 which takes digit positions according to the digit representation of the accumulator order, since it is rotated by the related accumulator wheel in a well known manner. The readout for the sub-total accumulator is shown in digit representing positions which represent a total of 0044. The contact points 623 of like digit values are interconnected by digit impulse transmitting wires marked 9—0. In circuit connection with the digit wires marked 9—0 are cam contacts CR97 to CR106, inclusive. These cam contacts transmit combinations of impulses 5, 3, 1, 0 marked alongside of the contacts in Fig. 5c. The timing for the 5, 3, 1, 0 impulses of CR97–106 contacts is shown in Fig. 6b. Thus, according to the digit representation of the accumulator readout, selected combinations of impulses 5, 3, 1, 0 are transmitted. For example, if the brush 653 of a readout order is a 9, the cam contacts CR97 close at times to transmit selected digit impulses 5, 3, 0. CR98 transmits impulses 5, 3, CR99, 5, 1, 0, etc. all as designated on the wiring diagram of Fig. 5c. These impulses are directed by a circuit from line 615, CB circuit breaker contacts, CR102 cam contacts (when 4 is the digit in the units order, for example), the 4-digit wire, contact point 623, brush 625, common current conducting segment 624, STRU relay contacts now transferred, LCU relay contacts now transferred, to plug socket 626.

Figure 5B:
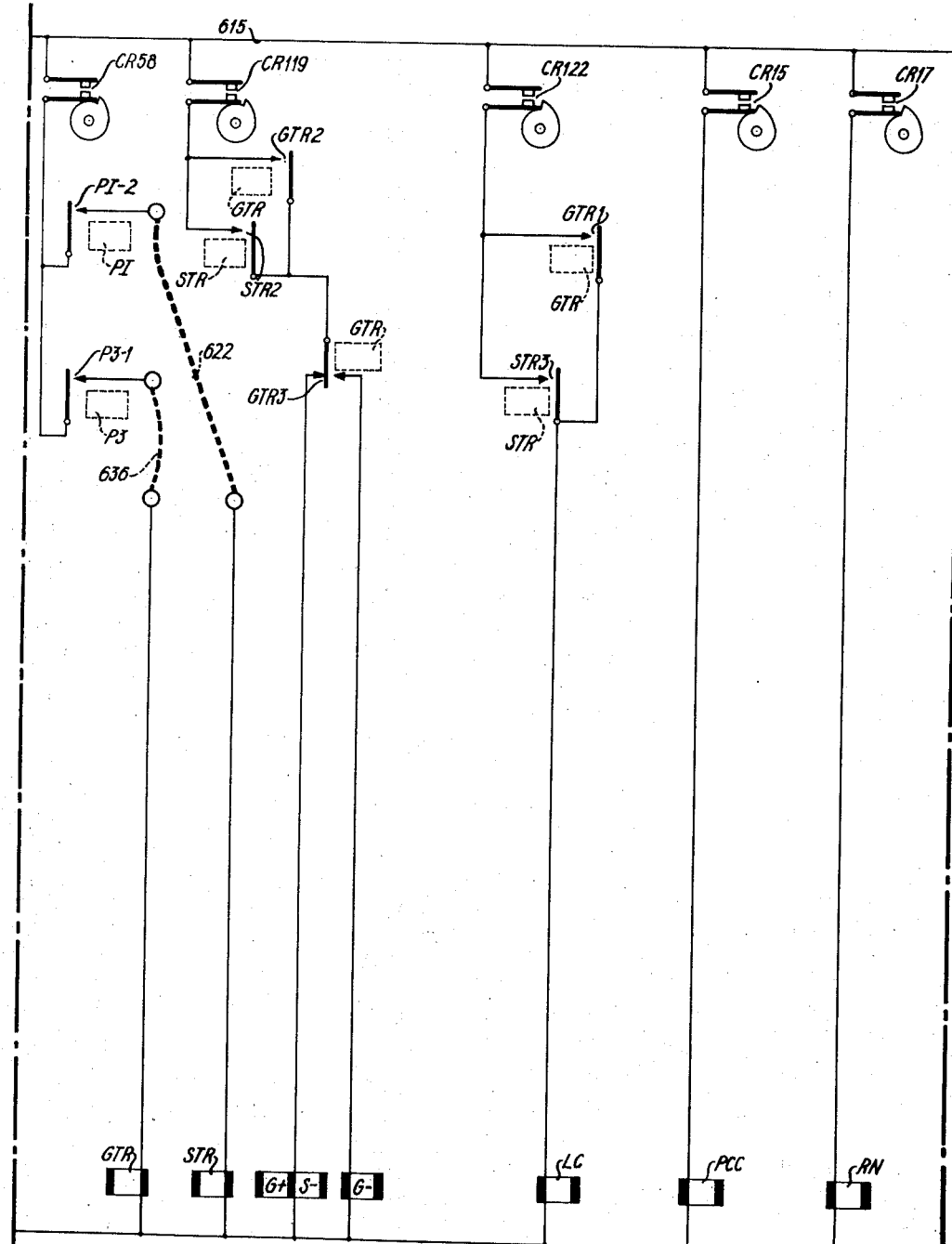
Figure 5D:
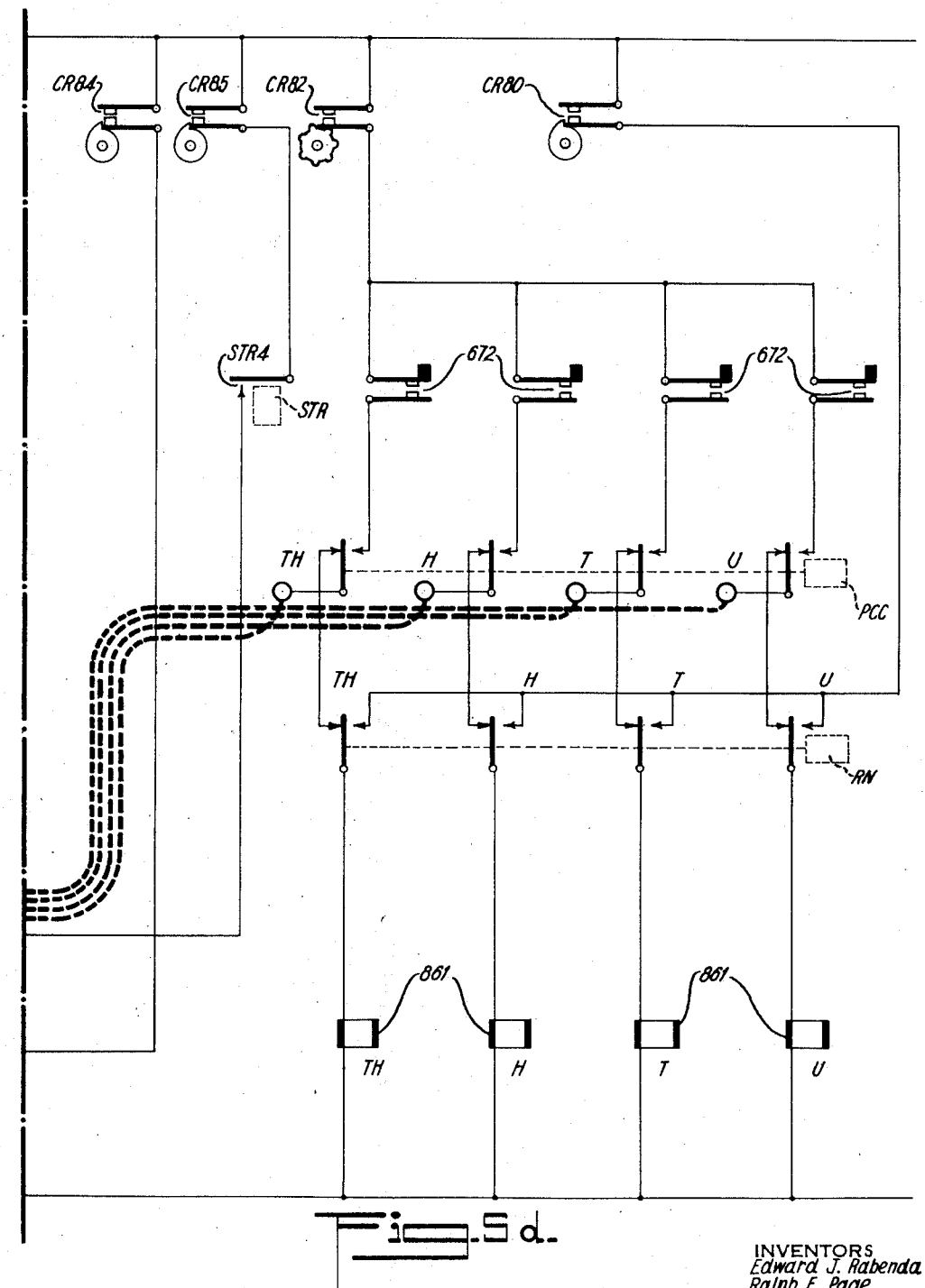

For causing the readout sections to control the desired orders of the combinational code translator and the printing mechanism, respective plug connections 627 are made between plug sockets 626 and plug sockets 628 (Fig. 5d). It should also be noted that during 0–78° of the first part of the cycle when cam contacts CR97–106 transmit impulses 5, 3, 1, 0, the LC and STR relays are energized.

Continuing now with the units order, impulses are directed by the related plug connection 627, plug socket 628 (Fig. 5d), through PCCU relay contacts now normal, RNU contacts now normal, translator control magnet 861 of the units order, to line 616. This magnet receives the impulses 3, 0 and as previously described the translator converts this combination of impulses to a 4-digit equivalent to cause the engagement of the type wheel clutch to initiate the rotation of the printing wheel to the 4-digit position. Thus, in each order the combinational impulses 5, 3, 1, 0 are selected by the readout for transmission to the code translator and conversion to a differentially timed digit equivalent. When all printing wheels 860 (Fig. 1a) are at their digit positions printing is effected by transmission of an impulse at the N time.

Referring to Fig. 5b at 166° of the cycle cam contacts CR17 close to pick up the RN relay by an obvious circuit. The RN relay transfers the RNU, T, H, TH contacts (Fig. 5d) so that a second impulse is directed to all orders of the translator control magnets 861 by a circuit from line 615, cam contacts CR89, the U, T, H, TH relay contacts of RN relay now transferred, to the respective translator control magnet 861, to line side 615.

Thus, printing of the digits of the total occurs. Of course, for left-hand orders of the readout representing a total digit of 0, the customary zero elimination arrangement prevents printing of such unnecessary zeros. Such feature is not shown herein as it is well known in the art.

Circuits to effect resetting of sub-total accumulator

The resetting of the sub-total accumulator occurs in the same cycle that the sub-total is printed but during the latter part thereof and utilizes differentially timed electrical reset control or stop impulses derived from the print wheel clutch. The start impulses are directed to each start magnet AM of the sub-total accumulator to rotate the accumulator wheel in the additive direction from its digit position to the reset position, which in the present machine, is the digit 9 position. The stop impulses are directed at such times that the 9 complement of the digit standing on the accumulator wheel is additively entered to thereby bring each wheel to 9.

It is preferable to derive the stop impulses from the type wheel clutches, each of which, it will be recalled, is engaged under control of the combinational impulse translator. The engagement of the printing wheel clutch to rotate the printing wheel to a selected digit position is simultaneous with the transmission of the stop impulse sent to the stop magnet SM. Reverting to Figs. 1a and 1b, it will be recalled that the combinational code translator causes a movement of the link 893 at differential points in the cycle, as is indicated in Fig. 6a. This causes the engagement of the printing wheel clutch at a differential time and after the engagement is effected type wheel contacts 672 (Fig. 1a) are closed at differential points in the cycle to transmit a stop impulse to the accumulator stop magnet SM of the same order.

Referring to Fig. 1a, the plate 898 has an inclined cam edge 670 which cooperates with and rocks the double arm 896 shortly after the clutch engagement has been effected. The lower arm 671 of double arm 896 bears against the top blade of contacts 672. Thus, it is evident that shortly after the engagement of the printing wheel clutch the slight clockwise movement of double arm 896 will close contacts 672. This closure occurs, of course, after the clutch has been engaged and the times that contacts 672 are closed to transmit differentially timed impulses 0–9 are shown in Fig. 6a.

Before the circuits for transmitting the stop impulses are explained, the impulsing circuits for energizing the start magnets AM of all denominational orders will first be described. Referring to Fig. 5c, it will be recalled that the S— relay is picked up at the last part of the cycle in which a group number change has been detected and CR119 cam contacts maintain the energization of this relay during the total printing and reset cycle up to about 275°. Therefore, when CR85 cam contacts close at about 140° of the cycle a circuit is closed from the line side 615, cam contacts CR85, STR4 relay contacts now closed, through the S—, U, T, H, TH relay contacts now closed, to each of the AM start magnets of the four denominational orders of the sub-total accumulator, to line side 616. This will cause the engagement of all accumulator wheel clutches and if any accumulator wheel stands at any other digit position than 9, the rotation of said accumulator wheel will be initiated to bring it by a movement which is the complement of the digit on the wheel to a 9 digit reset position.

During the rotation of the accumulator wheels stop impulses are directed to the SM stop magnets by a circuit now to be described. By an obvious circuit shown in Fig. 5b when CR15 cam contacts close between 100–315° of each cycle the PCC relay is energized to transfer its U, T, H and TH relay contacts. The stop impulse circuit is from the line 615, through circuit breaker contacts CR82 (Fig. 5d) which send impulses during the differential times that the type wheel contacts 672 are closed, thence through the respective U, T, H or TH relay contacts of the PCC relay now transferred, to the plug socket 628, related plug connection 627, plug socket 626 through the respective U, T, H and TH relay contacts of the LC relay now deenergized, to the respective SM stop magnet of the sub-total accumulator, to line 616.

Recalling that it was assumed that the accumulator represented 0044, with the brush 625 standing at the 4-digit position the contacts 672 of this order will be closed at 220°. However, the start impulse directed by CR85 cam contacts will have moved the accumulator wheel from 4 to 9 or five steps at the time that the stop magnet SM receives the impulse from the type wheel controlled contacts 672. Thus, the accumulator wheel will be stopped at the 9-digit position. The operation is the same for the tens order where 4 was assumed to be the total digit representation in this order. However, for the hundreds and thousands orders it was assumed that 0 is represented in each order, which is indicative of a positive or debit balance. The start impulse to the start magnets AM of such orders will initiate the 9 steps of movement. The printing wheel clutch is engaged to rotate print wheel 860 counterclockwise at about the same time that the print wheel arm 881 is rocked to rotate print wheel 860 clockwise, as a result of the N printing impulse. This will cause the printing from the 0 digit type. Engagement of the printing wheel clutch causes a later closure of contacts 672 sending a stop impulse to the SM magnet after the accumulator wheel has rotated nine steps to bring the wheel to the 9-digit position.

If a wheel stands at 9 (indicative in left-hand orders of a negative or credit balance), the closure of contacts 672 to send a stop impulse at 140° after the print wheel clutch is engaged to select the 9 type is coincident with or slightly earlier than the start impulse transmitted to the AM magnet by CR85 cam contacts. This prevents engagement of the clutch and the wheel remains at 9.

Transfer to grand totalizer

It is desirable that when the sub-total accumulator is reset to transfer the amount to the grand total accumulator so that the sub-total accumulator may receive amounts pertaining to the next group and the grand total accumulator may keep a running grand total, to be later printed as a grand total. The stop impulses directed to the SM magnets of the sub-total accumulator are concurrently directed to the AM magnets of the grand total accumulator, and the wheels of the grand total accumulator rotate until the mechanical knockoff pins 752 disengage the clutches, at which time the amount in the sub-total accumulator will have been transferred to the grand total accumulator.

Transfer of the amounts is controlled by the G+ relay which it is recalled, is energized concurrently with the S— relay. The reset control impulse to each AM magnet of the grand total accumulator is directed, for example, in the units order, from LCU contacts now normal, wire 641, the G+U relay contacts now transferred, AM magnet, line side 616.

It will be recalled that in the units order 4 was represented and 5 was entered in the sub-total accumulator to bring it to 9, the reset position. The same stop impulse initiates movement of the accumulator wheel of the units order of the grand total accumulator and rotation continues until 4 has been entered, the clutch disengagement being effected by pin 752. In the same manner, for other orders, the digits are transferred. Hence 0044 will be entered in the grand total accumulator, and the sub-total accumulator will have been rotated to reset position.

To continue with normal entering operations for the next group of cards, it is, of course, necessary to drop out the MI2 relay which it will be recalled is still held energized by relay contacts PI2—1 (Fig. 5a). During the above described sub-total taking cycle a circuit is completed from line side 615, wire 630 (Fig. 5a), PI—3 relay contacts now closed, INT2—1 transfer contacts now normal, CR132 cam contacts, pickup coil of PI2, to line side 616.

A hold circuit for PI2 relay is maintained by a circuit from the line 616, through the H coil of PI2, PI2h relay contacts, cam contacts CR46, wire 630, back to the line side 615. When PI2 relay is energized and held energized it opens the PI2—1 contacts to deenergize MI2 relay. The hold circuit for PI2 is held slightly longer after the time that the CR42 cam contacts are opened, thus maintenance of the hold circuit for PI2 longer than the hold circuit of MI2 by CR42 cam contacts will finally result in the deenergization of the MI2 relay coil.

Intermediate group number control

It is desirable that after the grand total accumulator has received a series of sub-totals that the grand total amount be printed, and the grand total accumulator is then reset. The preferred form of control is by the automatic group control and these operations are initiated when an intermediate group number change has been detected. However, such group number change also initiates the printing of a sub-total, reset of the sub-total accumulator, and then the transfer of the sub-total amount to the grand total accumulator, all being effected in one machine cycle prior to the machine cycle in which the grand total accumulator is read out, its total printed and reset.

Minor control initiated by the intermediate group number change

The intermediate automatic group control comparing circuits comprise paired relays RI—R10, R8—R11, R9—R12 (Fig. 5a), each of which is energized under control of holes in the card columns representing a digit of the intermediate group number. As described before, upon a dissimilarity in holes in corresponding columns one comparing circuit is closed to complete a circuit to plug socket 635, then through a plug connection 631, to a plug socket 632, through the pickup coil of the INT1 relay, wire 621, to line side 616. The hold coil for the INT1 relay is completed through the h contacts, cam contacts CR41 and P1—3 relay contacts, just as for the MI1 relay. The INT1—2 relay contacts close to complete a circuit from line side 615, CR41 cam contacts, INT1—2 relay contacts, the H coil of MI1, wire 621, to line side 616. MI1 relay picks up MI2 relay as before. Thus, upon an intermediate group number change, the MI1 and MI2 relay coils are picked up, and operations will be initiated as has been previously described. Thus, the total of the amounts entered in the sub-total accumulation before a change in the intermediate group number will be read out, printed as a sub-total and transferred to the grand total accumulator. However, due to the control exercised by the INT1 relay the machine will be conditioned for printing of the grand total and resetting of the grand total accumulator as will now be described.

*Printing of grand total and reset of grand total accumulator*

The INT1 relay now being energized in the cycle a group change has been detected, it closes its INT1—3 relay contacts to complete a circuit from line side 615, through CR43 cam contacts, INT1—3 relay contacts, pickup coil of INT2 relay coil, wire 621 to line side 616. The hold coil of INT2 is held through the h contacts and CR42 cam contacts (as well as P12—1 relay contacts) back to line 615. Hence MI2 and INT2 relay coils are held energized during the sub-total printing cycle by cam contacts CR42, and after they open at 315° by P12—1 relay contacts during the grand total taking and reset cycle.

The INT2 relay coil transfers its INT2—1 contacts so that now when CR132 cam contacts close the impulse circuit normally effective in the sub-total taking cycle to pick up P12 relay through P1—2 relay contacts, will be open at INT2—1 relay contacts so P12 relay will not be energized during the cycle when a grand total is initiated.

Thus, when cam contacts CR47 close during the sub-total taking cycle, at 273°, a circuit will be completed from line side 615, through CR47 cam contacts, P12—2 relay contacts now closed, P1—1 relay contacts now closed (since P1 relay coil is held energized by CR50 cam contacts to 288°), pickup coil of P2, line side 616. The hold circuit is through the h contacts and cam contacts CR49, back to line side 615. Before cam contacts CR49 open at 320° cam contacts CR48 close at 305° completing a circuit from line side 615, CR48 cam contacts, P2—1 relay contacts, pickup coil of P3, to line side 616. The hold circuit is back through the h contacts, CR50 cam contacts to line side 615. Hence, P3 relay coil is held energized through the grand total printing and reset cycle up to 288°.

At 330° of the sub-total printing cycle when cam contacts CR58 close a circuit is completed from line side 615, through cam contacts CR58, P3—1 relay contacts; plug connection 636, GTR grand total control relay to line side 616. Thus, GTR is held concurrently with the P3 relay coil up to 288° during the grand total taking cycle. Of course, at 288° of the sub-total cycle when CR50 cam contacts open, P1 relay coil and STR relay drop out. Thus, for the grand total taking cycle only GTR and G— relay coil are energized.

During the grand total taking cycle the RN, PCC relays are energized, as described before.

It is explained that the readout of the grand total, printing the grand total, and resetting the grand total accumulator are effected in the same manner as previously described for the sub-total accumulator. For this reason the description need only be general.

*Readout of grand total accumulator and printing of grand total*

Printing of the grand total is effected by transmitting the impulses from the four orders of the readout of the grand total accumulator to the translator control magnets 861, which are preferably the same orders used to print the sub-total. The grand total readout is exactly the same as the sub-total readout, and the four orders are designated by a "G". To transmit the selected impulses the GTR relay is energized to close its U, T, H, TH contacts (Fig. 5c). The LC relay is also energized to close its U, T, H, TH contacts by a circuit now to be described.

The energizing circuit for LC relay is from line side 615, cam contacts CR122 (Fig. 5b), GTR1 relay contacts now closed, LC relay to line side 616.

The impulse circuit from each order of the readout extends for an exemplary order from the common segment 824, through the GTRU relay contacts now closed, LCU contacts now transferred, plug socket 626U, plug connection 627, plug socket 628, PCCU contacts now normal, RNU contacts now normal, translator control magnet 861 of the units order, line side 616.

Thus, as has been explained selected impulses are transmitted in combinations to the translator control magnet 861. The translator converts the combinations of impulses to a single differentially timed equivalent, and by an engagement of the print clutch the printing wheel goes to a digit position corresponding to a digit of the total. Of course, the printed result sheet is spaced to separate the previously printed sub-total from the grand total.

*Resetting grand total accumulator*

The grand total accumulator is reset in the same cycle that the grand total is printed, and in the manner previously described for sub-total accumulator reset operations.

Impulses are transmitted to the AM start magnets of the grand total accumulator by a start impulse from the CR84 cam contacts, and through the U, T, H, TH relay contacts of the G— relay which is energized by the following circuit:

Line side 615, cam contacts CR119, GTR2 relay contacts now closed, GTR3 relay contacts now transferred, G— relay coil, line side 616. Thus, impulses are transmitted from line side 616, cam contacts CR84, G—U relay contacts now closed, AMU start magnet, to line side 616. By a similar circuit for all orders the wheels of the grand total accumulator start rotating and are terminated by stop impulses directed to the SM stop magnets under control of contacts 672 by the following described circuit:

From line side 615, CR82 cam contacts, contacts 672 of the units order, PCCU relay contacts now transferred, plug socket 628, plug connection 627, plug socket 626, LCU relay contacts now normal, wire 641, G+U relay contacts now normal, SM stop magnet to line side 616. Due to the branch wire connection to each SM stop magnet of the sub-total accumulator, the latter are also energized but with no effect due to the construction of the accumulator. If so desired, interlock contacts in each branch circuit may be opened by any control relay, such as the PCC relay, if found objectionable.

In this manner the rotation of each accumulator wheel of the grand total accumulator is stopped after a complement entry, and thus the latter is brought to a reset position.

It will be recalled that during the grand total printing and reset cycle, P3 relay (Fig. 5a) is energized up to 288° so that, when cam contacts CR132 (Fig. 5a) close at 176° a circuit is closed from line side 615, P3—2 relay contacts, INT2—1 relay contacts now transferred, CR132 cam contacts, pickup coil of P12 to line side 616. P12 relay coil opens P12—1 relay contacts to thus deenergize the INT2 and MI2 relay coils at the midpoint of the grand total printing and reset cycle.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an accounting machine, a printing wheel having digit type, a printing wheel clutch which is engaged at a differential time to initiate rotation of said printing wheel to select a digit type for printing, an accumulator wheel and a total digit readout settable under control of said wheel, an accumulator wheel clutch, means for reading out said total digit readout and controlling said printing wheel clutch to engage said printing wheel clutch at differential times and without effecting said accumulator wheel clutch to initiate the rotation of said printing wheel to a corresponding total digit position, and means operable as a result of the engagement of said printing wheel clutch to control said accumulator wheel clutch for a reset operation of said accumulator wheel.

2. In an accounting machine, a printing wheel having digit type, a printing wheel clutch which is engaged at a differential time to initiate rotation of said printing wheel to select a digit type for printing, an accumulator wheel and a total digit readout settable under control of said wheel, an accumulator wheel clutch, means for reading out said total digit readout and controlling said printing wheel clutch to engage said printing wheel clutch at differential times and without effecting said accumulator wheel clutch to initiate the rotation of said printing wheel to a corresponding total digit position, means to engage said accumulator clutch to initiate the rotation of said accumulator wheel from its digit position to a reset position, and means operable as a result of the engagement of said printing wheel clutch to disengage said accumulator wheel clutch at said reset position of said accumulator wheel.

3. In an accounting machine, a printing wheel having digit type, a printing wheel clutch which is engaged at a differential time to initiate rotation of said printing wheel to select a digit type for printing, an accumulator wheel and a total digit readout settable under control of said wheel, an accumulator wheel clutch, means for reading out said total digit readout and controlling said printing wheel clutch to engage said printing wheel clutch at differential times and without effecting said accumulator wheel clutch to initiate the rotation of said printing wheel to a corresponding total digit position, means to engage said accumulator clutch to initiate rotation of said accumulator wheel from its digit position to a reset position, means operable as a result of the engagement of said printing wheel clutch to disengage said accumulator wheel clutch at said reset position of said accumulator wheel, a second accumulator wheel, a second accumulator clutch for said second accumulator wheel, means operable as a result of the engagement of said printing wheel clutch to engage said second accumulator clutch to initiate rotation of the second accumulator wheel, and means for disengaging said second accumulator clutch at a fixed time to effect the transfer of the digit printed and cleared out of the first accumulator wheel to the second accumulator wheel.

4. In an accounting machine, a printing wheel having digit type, a printing wheel clutch which is engaged at a differential time to initiate rotation of said printing wheel to select a digit type for printing, an accumulator wheel and a total digit readout settable under control of said wheel, an accumulator wheel clutch, means for reading out the total digit representations of said readout and controlling said printing wheel clutch to engage said printing wheel clutch at differential times without effecting the engagement of said accumulator wheel clutch to initiate the rotation of said printing wheel to a corresponding total digit position, means to engage said accumulator wheel clutch to initiate rotation of the accumulator wheel to a reset position, and means controlled by said printing wheel clutch and directly operable as a result of the engagement of the printing wheel clutch to effect the disengagement of the accumulator wheel clutch to terminate the rotation of said accumulator wheel at its reset position.

5. In an accounting machine, a printing wheel having digit type, a printing wheel clutch which is engaged at a differential time to initiate rotation of said printing wheel to select a digit type for printing, an accumulator wheel and a total digit readout settable under control of said wheel, an accumulator wheel clutch, means for reading out the total digit representations of said readout and controlling said printing wheel clutch to engage said printing wheel clutch at differential times without effecting the engagement of said accumulator wheel clutch to initiate the rotation of said printing wheel to a corresponding total digit position, means to engage said accumulator wheel clutch including an "advance" clutch control magnet, means to energize said advance magnet to engage said accumulator wheel clutch to initiate rotation of the accumulator wheel to a reset position, means including a "stop" clutch control magnet to disengage said accumulator wheel clutch, and electrical means controlled by said printing wheel clutch and operable as a result of the engagement of the printing wheel clutch to energize said stop magnet to effect the disengagement of the accumulator wheel clutch to terminate the rotation of said accumulator wheel at its reset position.

6. In a machine of the class described, the combination of an accumulator having for each order a total digit readout set thereby to digit positions 0-9, a combinational impulse translator and converting means including means to receive combinations of electrical impulses according to a code and means for translating and converting said combinations and emitting a single differentially timed equivalent, a digit printing wheel, driving means, a printing wheel clutch for engaging said printing wheel with said driving means, means for transmitting combinations of electrical impulses according to the total digit representation on said readout to said receiving means, means for engaging said printing wheel clutch with said driving means according to said differentially timed equivalent to initiate rotation of said printing wheel to a digit position corresponding to the digit position of said readout, an accumulator wheel clutch, a magnet for engaging said clutch with said driving means to initiate rotation of said accumulator wheel, a second magnet for subsequently disengaging said clutch to stop the rotation of said accumulator wheel, means for energizing said first named magnet to engage said accumulator clutch to initiate rotation of said accumulator wheel from its digit position to a reset position, and electrical impulse means controlled by said printing wheel clutch to transmit an impulse to said second magnet to disengage said accumulator wheel clutch when said accumulator wheel is at said reset position.

EDWARD J. RABENDA.
RALPH E. PAGE.
HORACE S. BEATTIE.

No references cited.